United States Patent [19]

Raskin et al.

[11] Patent Number: 5,690,836
[45] Date of Patent: Nov. 25, 1997

[54] METHOD OF REMOVING CATALYST

[75] Inventors: Matthew Raskin, Huntington Station, N.Y.; James R. Gallagher, Wollaston, Mass.

[73] Assignee: Pall Corporation, East Hills, N.Y.

[21] Appl. No.: 454,007

[22] Filed: May 30, 1995

Related U.S. Application Data

[63] Continuation of Ser. No. 196,518, Feb. 15, 1994, abandoned, which is a continuation of Ser. No. 922,880, Jul. 31, 1992, abandoned.

[51] Int. Cl.$^6$ .................. B01D 24/46; B01J 20/34
[52] U.S. Cl. .......... 210/791; 210/636; 210/505; 210/767; 502/21; 502/22; 502/523
[58] Field of Search ................ 502/301, 21, 523; 210/505, 767, 791, 636; 208/143; 554/176

[56] References Cited

U.S. PATENT DOCUMENTS

| | | | |
|---|---|---|---|
| 2,654,440 | 10/1953 | Robinson | 210/486 |
| 2,935,499 | 5/1960 | Albright et al. | |
| 3,414,129 | 12/1968 | Going et al. | 210/798 |
| 3,477,582 | 11/1969 | Baldwin | 210/331 |
| 3,648,844 | 3/1972 | Krynski et al. | 210/487 |
| 4,226,742 | 10/1980 | Bearden, Jr. et al. | 502/170 |
| 4,232,087 | 11/1980 | Trask | 428/389 |
| 4,240,908 | 12/1980 | Swain et al. | 252/325 |
| 4,362,630 | 12/1982 | Young | 210/745 |
| 4,414,401 | 11/1983 | Wihtermyer et al. | |
| 4,525,207 | 6/1985 | Inouka | 208/58 |
| 4,594,202 | 6/1986 | Pall et al. | 264/8 |
| 4,647,369 | 3/1987 | Kam et al. | 210/111 |
| 4,726,901 | 2/1988 | Pall et al. | 210/496 |
| 4,822,692 | 4/1989 | Koehler | |
| 4,892,658 | 1/1990 | Martin et al. | 210/617 |
| 5,017,241 | 5/1991 | Ryan | 134/22.12 |
| 5,074,989 | 12/1991 | Sigaud et al. | 210/109 |
| 5,110,954 | 5/1992 | Bellis | |
| 5,114,596 | 5/1992 | Laterra | 210/798 |
| 5,160,444 | 11/1992 | McFarland | 210/805 |
| 5,174,907 | 12/1992 | Chown et al. | 210/791 |
| 5,271,850 | 12/1993 | Stutzman | 210/767 |
| 5,290,446 | 3/1994 | Degen et al. | 210/489 |

FOREIGN PATENT DOCUMENTS

| | | |
|---|---|---|
| 148 638 | 12/1984 | European Pat. Off. . |
| 216711 | 9/1986 | European Pat. Off. . |
| 26603276 | 3/1988 | France . |
| 49-117423 | 3/1973 | Japan . |
| 55-51439 | 4/1980 | Japan . |
| 63-83031 | 9/1986 | Japan . |
| 8605751 | 9/1985 | Spain . |
| 856 331 | 12/1960 | United Kingdom . |
| 1 096 260 | 12/1967 | United Kingdom . |
| 1407932 | 10/1975 | United Kingdom . |
| 2 152 471 | 8/1985 | United Kingdom . |
| 2 153 246 | 8/1985 | United Kingdom . |
| WO94/11082 | 11/1993 | WIPO . |

OTHER PUBLICATIONS

"Pall Backwash Filter Systems for Solid/Liquid Separation" (Pall Corporation, 1993).
"Prosep™ Filters Automated Filtration Systems Technology" (Pall Corporation, 1993).
"FUNDA® The Filter" (Chemap, Inc., date unknown).
Search Report (France), dated Apr. 29, 1994.
Data Base WPIL in Questel, London, Derwent Publications Ltd., A N 93-136921, JP 05-068869 (Asahi Chem), Mar. 23, 1993.

*Primary Examiner*—Glenn Caldarola
*Assistant Examiner*—In Suk Bullock
*Attorney, Agent, or Firm*—Leydig, Voit & Mayer, Ltd.

[57] ABSTRACT

A method of removing a catalyst, particularly Raney nickel, from a catalytic reaction product, particularly a hydrogenation reaction product, by passing the catalytic reaction product containing the solid catalyst through a hollow tubular filter medium which comprises a nonwoven web of fibers, has a tapered pore distribution such that the pore size of the filter medium decreases in the direction of normal fluid flow, and is backwashable.

25 Claims, No Drawings

METHOD OF REMOVING CATALYST

CROSS-REFERENCE TO RELATED APPLICATIONS

This is a continuation of application Ser. No. 08/196,518, filed Feb. 15, 1994, now abandoned, which, in turn, is a continuation of application U.S. Ser. No. 07/922,880, filed on Jul. 31, 1992, now abandoned.

TECHNICAL FIELD OF THE INVENTION

The present invention pertains to a method of removing a catalyst from suspension after a catalytic reaction has been effected. In particular, the present invention is concerned with removing a catalyst, especially Raney nickel, from a catalytic reaction product, such as a product of a hydrogenation reaction, to purify the product and recover the catalyst for subsequent use and/or reclamation.

BACKGROUND OF THE INVENTION

Catalysis is the key to the greatly expanded modern chemical and petroleum industries. About 90% of chemical manufacturing processes are catalytic, corresponding to 15–20% of all manufactured goods in the United States. Sulfuric acid, ammonia, edible oils, aromatic hydrocarbons, butadiene, cyclohexane, amines, hydrogen peroxide, caprolactam, vinyl acetate, acetaldehyde, acetic acid, analine, alcohols, acrylonitrile, maleic anhydride, synthetic rubber and plastics, and specialty organic compounds are now produced almost completely by catalytic processes.

A catalyst is a substance which increases the rate of a chemical reaction, but is present in its original concentration at the end of the reaction, i.e., it is not consumed in the reaction. Catalysts are believed to function through an unstable chemical complex formed between catalyst and reactant molecules. This complex reacts to produce new compounds with dissociation of the complex and regeneration of the catalyst. Because the catalyst remains in the product after the chemical reaction, the catalyst must be removed so as to provide a pure product and to recover the valuable catalyst.

There are many types of catalytic reactions. A widely utilized catalytic reaction is hydrogenation. Hydrogenation is a general method for the conversion of a carbon-carbon double bond into a carbon-carbon single bond in almost any kind of organic compound. A catalyst brings about the addition of molecular hydrogen, $H_2$, to the double bond. Without a catalyst, hydrogenation proceeds at a negligible rate. The catalyst lowers the activation energy so that the reaction can proceed spontaneously and rapidly.

Catalysts are comprised of a wide range of chemicals represented by both elements and compounds, especially metals, halides, oxides, and sulfides. Nickel is a frequently used hydrogenation catalyst because of its ability to chemisorb hydrogen. There are many types of nickel catalysts. Raney nickel is a nickel-aluminum catalyst which is used widely in laboratory and industrial hydrogenation processes. It is the most active and least specific of the nickel catalysts and typically has a mean particle size of two to three microns.

Raney nickel catalyst has been used in a variety of ways to effect a catalytic reaction. For example, Raney nickel can be used in a continuous hydrogenation process by filling a tube with chunks of the nickel-aluminum alloy and activating the surface by passing a solution of caustic over it, thereby removing some of the surface aluminum. Periodic flushes with caustic enables the catalyst to be reactivated in place. Another use of Raney nickel is in a particulate form dispersed in the reaction mixture, which maximizes the available surface area for catalytic reaction.

In addition to a catalyst for hydrogenation, Raney nickel is also used as a coupling agent. For example, in the synthesis of hexestrol, Raney nickel acts as a coupling agent to give a 25% yield of the meso isomer. Raney nickel can also be used as an alkaline electrolyte in fuel cells.

There are a number of variations on the nickel-aluminum catalyst. For example, rolling nickel and aluminum foil at 630° C. followed by leaching with caustic. Nickel-aluminum alloy has also been flame sprayed on the inside of tubes followed by leaching. Nickel-iron-aluminum alloy, upon caustic activation is a catalyst for selective hydrogenation of organic nitro compounds.

Other types of nickel catalysts are also used in catalytic reactions. A composition of nickel and silicon yields NiSi and $NiSi_2$, which upon caustic leaching, activates a nickel surface. Nickel-boron alloy, when activated with caustic, may even be a more reactive hydrogenation catalyst than the nickel-aluminum catalyst. Nickel carbonate and nickel hydroxide are used to make precipitated catalysts. Supported catalysts of nickel on alumina or nickel on zirconia can be used for the hydrogenation of CO. Nickel sulfide and nickel tungsten sulfide are used when high concentrations of sulfur compounds are present in the hydrogenation of petroleum distillates. Nickel-molybdenum catalysts are used to denitrogenate petroleum fractions high in nitrogen-containing components. Nickel-iron and nickel-copper oxides are used for the efficient $NO_x$ reduction in automobile exhaust.

The disadvantage arising in the use of many catalytic reactions, particularly hydrogenation reactions, is the difficulty in separating the catalyst from the product once the reaction is completed. It is desirable to separate the catalyst from the product so as to have a pure product and recover the valuable catalyst. This is particularly difficult for catalysts such as Raney nickel in fine particulate form.

A plate-and-frame press, with or without a filter aid, i.e., diatomaceous earth, is often employed for the recovery of catalysts, particularly in hydrogenation reactions. A plate-and-frame press is an alternate assembly of plates covered on both sides with a filter medium, usually a cloth, and hollow frames that provide space for cake accumulation during filtration. The frames have feed and wash manifold ports, while the plates have filtrate drainage ports. A rectangular shaped plate is most common, making the fullest use of filter media, but circular shapes are also used. The plates may be constructed of a variety of materials such as metals, with or without plastic coatings, wood, polypropylene, and glass-filled polyester.

The plates are hung on a pair of horizontal support bars and pressed together during filtration to form a watertight closure between two end plates, one of which is stationary. Several feed and filtrate arrangements are possible. In the most popular, the feed and discharge of the several elements of the press are manifolded via some of the holes that are in the four corners of each plate and frame to form continuous longitudinal channels from the stationary end plate to the other end of the press. Alternatively, the filtrate may be drained from each plate by an individual valve and spigot (for open discharge) or tubing (for closed). Top feed to and bottom discharge from the chambers provide maximum recovery of filtrate and maximum mean cake dryness. This arrangement is especially suitable for heavy fast-settling solids. For most slurries, bottom feed and top filtrate discharge allow quick air displacement and produce a more uniform cake.

The plate-and-frame press has several disadvantages including high operating cost, high waste, i.e., imperfect washing due to variable cake density, relatively short filter-cloth life due to the mechanical wear of emptying and cleaning the press, high labor requirements, and adverse operator exposure arising from the requirement to open the filter for cake discharge. Furthermore, plate-and-frame presses generally require a large amount of space and do not lend themselves to automatic operation and control.

Stainless steel woven wire mesh filters, similar to Rigimesh® filters (Pall Corporation) and the S-Series PSS® seamless, porous metal filters disclosed in U.S. Pat. No. 4,822,692, have been used to recover solid catalysts from catalytic reaction products. These filters, however, are not always effective in recovering fine particulate catalysts such as Raney nickel. In particular, such filters may not achieve stable operation, may not fully remove the catalyst, and may become permanently clogged after only a few cycles in removing a catalyst such as Raney nickel catalyst from a catalytic reaction product.

There remains a need, therefore, for an efficient and economical method of removing a catalyst from a product after catalytic reaction, particularly hydrogenation. It is an object of the present invention to provide such a method.

It is another object of the present invention to provide a method of removing a catalyst from a catalytic reaction product, particularly a hydrogenation reaction product, without adverse operator exposure.

It is a further object of the present invention to provide a method of removing a catalyst from a catalytic reaction product for an extended period of time with periodic back-washing of a filter medium.

These and other objects and advantages of the present invention, as well as additional inventive features, will be apparent from the description of the invention provided herein.

BRIEF SUMMARY OF THE INVENTION

The present invention involves a method of removing a solid catalyst from a product after a catalytic reaction by passing the product through a hollow cylindrical filter medium which comprises a nonwoven web of fibers and which has a tapered pore distribution such that the pore size of the filter medium decreases in the direction of normal fluid flow. The present inventive method provides for the removal of a sufficient amount of catalyst so that the product contains an acceptable level, e.g., 10 ppm or less, preferably 3 ppm or less, and most preferably 1 ppm or less, of catalyst. The method of the present invention is particularly well-suited to the removal of Raney nickel catalyst of a mean particle diameter of 3 microns or less from a hydrogenation reaction product.

DESCRIPTION OF THE PREFERRED EMBODIMENTS

The present invention involves a method of removing a catalyst from a product after a catalytic reaction. In particular, the present invention concerns the removal of a solid catalyst from a catalytic reaction product for the purpose of purifying the catalytic reaction product and/or recovering the solid catalyst for reuse or reclamation.

The present inventive method of removing a solid catalyst from a product after a catalytic reaction is accomplished by passing the catalytic reaction product through a hollow tubular filter medium which comprises a nonwoven web of fibers and which has a tapered pore distribution such that the pore size of the filter medium decreases in the direction of normal fluid flow.

The present inventive method permits the removal of solid catalysts in particulate form from catalytic reaction products. While the solid catalyst may have any suitable particle size, the present invention is particularly well-suited to the removal of a catalyst having a mean particle diameter of about 20 microns or less. The present inventive method is preferably utilized in the removal of catalyst having a mean particle diameter of about 5 microns or less, most preferably catalyst having a mean particle diameter of about 2 microns to about 3 microns.

The method of the present invention provides for the removal of a sufficient amount of catalyst from a catalytic reaction product so that the product contains an acceptable level of catalyst contamination. Generally, this acceptable level is determined by a visual clarity test, e.g., by examining the filtered product to determine whether there is an undesirable amount of catalyst therein. The present invention is capable of reducing the level of catalyst in the catalytic reaction product to specific acceptable levels, e.g., 10 ppm or less, preferably 3 ppm or less, and most preferably 1 ppm or less.

The present invention can be used to remove a variety of solid catalysts, such as nickel, palladium, and platinum catalysts, from a variety of catalytic reaction products, such as hydrogenation reaction products. Suitable nickel catalysts include Raney nickel, nickel sulfide, nickel tungsten sulfide, and nickel molybdenum. The present inventive method is particularly well-suited to removing Raney nickel from a hydrogenation reaction product.

The present inventive method contemplates backwashing the filter medium when the filter medium becomes sufficiently clogged with particulate matter, e.g., when the pressure drop across the filter medium reaches an unacceptable level, in order to remove the built-up cake of catalyst and other contaminants on the filter medium. The filter medium in the context of the present invention may be backwashed and reused over and over again for multiple cycles, e.g., filterings, without the need for operator handling of the filter medium and exposure to potentially hazardous materials as is the case with other filtration techniques such as those utilizing plate-and-frame presses. Preferably, after each filtering of a catalyst-containing product, the filter medium is backwashed. The filter medium is usable for multiple cycles, e.g., about 50 or more cycles, preferably about 1000–2000 or more cycles.

The backwashing of the filter medium may be effected in any suitable manner, such as by directing a relatively contaminant-free fluid through the filter medium in a direction opposite to the normal flow of catalytic reaction product being filtered. Any suitable backwashing fluid may be utilized such as a relatively pure, compatible fluid, e.g., water, or the filtrate, i.e., a portion of the filtered catalytic reaction product. The backwashing fluid will typically be forced through the filter medium under pressure, usually by utilizing a gas, preferably air or an inert gas such as nitrogen, under pressure to effect a hydraulic pulse across the filter membrane in a direction opposite to the filtration flow to dislodge the built-up catalyst cake on the filter medium. The backwash fluid and particulate matter removed from the filter medium may be directed to a suitable storage or concentrator unit for further processing, reuse, or reclamation.

The filter medium used in the context of the present invention may be prepared in any suitable manner, preferably by having fibers melt-blown, layered, and secured onto a suitably pervious substrate. A preferred filter medium is the Profile® filter medium (Pall Corporation). U.S. Pat. Nos. 4,594,202 and 4,726,901 generally disclose such a filter medium and are incorporated in their entireties herein by reference. Since the filter medium will be subjected to repeated backwashing, the filter medium must be physically capable of withstanding the rigors of backwashing. The filter medium, therefore, has a void volume of about 75% or less, e.g., about 50–75%, preferably about 72% or less, e.g., about 60% to about 72%, and most preferably about 72%, to ensure a sufficiently high density and structural integrity to withstand repeated backwashing without adversely affecting the desirable filtering characteristics of the filter medium.

The fibers of the filter medium may be formed around a hollow support core or tube. The hollow core may be of any suitable material which is pervious to the catalytic reaction product, e.g., which does not significantly affect the pressure drop across the filter medium. Generally, the core will be prepared from a nonporous material which is perforated or fenestrated with a series of holes to allow the catalytic reaction product to readily flow through the core. The core primarily provides internal support for the filter medium and should be strong enough to resist the forces acting on the core and filter medium. The core should be selected so as to provide adequate support during filtration, as well as back-flushing of the filter medium.

The core of the filter medium can be made by a variety of processes and from a variety of materials. For example, the core may be prepared from synthetic resin such as polypropylene by injection molding or extrusion, or from metal such as stainless steel by conventional metal forming techniques. The core configuration and material should be selected so as to withstand the filtration and backwashing conditions and to ensure that there is no adverse interaction with the catalytic reaction product and filter medium. For example, in high temperature applications, the core is preferably of a perforated or fenestrated metal construction, e.g., aluminum or stainless steel, while, in low temperature applications, the core is preferably prepared from a plastic material, e.g., polypropylene.

The core may be of any suitable diameter which will usually be determined by the necessary diameter of the overall filter element and the thickness of the filter medium determined by the end-use of the filter element. Generally, the largest possible core internal diameter is preferred so as to allow the catalytic reaction product to easily progress down the length of the interior of the filter medium.

The fibers of the filter medium may be prepared from any suitable organic material, such as nylon, fluoropolymer, polypropylene, polyethylene, polyester, polystyrene, and polyurethane resin, or from inorganic materials, such as glass, carbon, aluminum, and stainless steel. The filter medium preferably is prepared from polypropylene fibers layered onto a stainless steel support, polypropylene fibers layered onto a polypropylene support, or from polyester fibers layered onto a polyester support. The filter medium is most preferably of a polypropylene construction, which is relatively inexpensive and generally resistant to chemical degradation. Polypropylene, however, has a low deformation temperature rendering it ill-suited for high temperature environments and, further, is subject to degradation by aromatic solvents. Other fiber mediums, such as polyester are preferably used in high temperature environments and with aromatic solvents.

The filter medium may have any suitable overall structure. The filter medium, for example, may be configured into a square, oblong, or circular design. The filter medium is preferably of a long, cylindrical, open core design, with the filtrate flowing from outside the filter medium toward the open core and out an open end of the filter medium. With the preferred cylindrical tube configuration for the filter medium and usual fluid flow, generally from the outside to the inside of the filter medium, the pores of the filter medium preferably decrease in size from the perimeter of the filter medium toward the center of the filter medium.

The filter medium may have any suitable dimensions. In the preferred embodiment involving a long, hollow, cylindrical filter medium, the filter medium preferably has an inner diameter of about 0.5 inch to about 1.5 inches and an outer diameter of about 1 inch to about 2 inches, more preferably about 1 inch to about 1.5 inches.

For the purpose of ensuring that the filter medium can withstand the rigors of backwashing, the surface of the filter medium exposed to the catalyst-laden reaction product is preferably covered with a protective material. The protective material aids in maintaining the structural integrity of the filter medium during backwashing by resisting the tendency of the surface fibers to separate from the remainder of the filter medium during the reverse fluid flow encountered in backwashing the filter medium. The protective material may be of any suitable construction and material and will typically be pervious to the catalytic reaction product so as not to provide a filtration function itself. The protective material is preferably a metal mesh, such as of aluminum or stainless steel, although a plastic mesh or nonwoven material, such as a polypropylene, may also be used. The protective material is most preferably a pervious stainless steel mesh. The protective material may be applied in any suitable manner to the filter medium.

The filter medium will usually have a 99.98% removal efficiency at no greater than about 10 microns, e.g., 5 microns. The filter medium preferably has a 99.98% removal efficiency from about 5 microns to about 10 microns, more preferably at about 10 microns. At lower pore ratings, the filter medium will be more effective in reducing the amount of catalyst in the catalytic reaction product to an appropriately low level, albeit with higher pressure drops across the filter medium. At higher pore ratings, the filter medium will exhibit desirably low pressure drops across the filter medium, but will be less effective in removing the catalyst from the catalytic reaction product.

The removal efficiency of the filter medium is determined herein by the OSU-F2 test, also known as the beta rating system. Specifically, for data in the 0.5 to 25 µm range, a standardized silicious contaminant, AC Fine Test Dust, is prepared as a stable suspension in water at a preset concentration, and the suspension is pumped at 5 gpm/sq. ft. through the filter element. For data in the 25 to 90 µm range, a military standard oil with a viscosity of 10 centipoise is used with a standardized silicious contaminant, AC Coarse Test Dust, and the suspension is pumped at 10 gpm/sq. ft. through the filter element. The test system is equipped with an upstream and a downstream particle counter to count the amount of contaminant of particular diameters upstream and downstream of the filter medium, and these counts are used to determine the removal efficiencies with respect to particular contaminant diameters.

The filter medium used in the context of the present inventive method may also be appropriately charge modified to increase its efficiency in removing catalyst particulates. A desirable charge modification will depend on the specific nature of the product and the catalyst therein. The filter medium is not used with a resin precoat and preferably does not include any type of precoat.

Optionally, an additional or polishing filter may be used further downstream to further reduce contamination in the catalytic reaction product, e.g., a Profile® or HDC® filter (Pall Corporation) of a 1 μm or 0.5 μm pore rating. Such an additional or polishing filter may be either disposable or backwashable, preferably disposable. When the additional or polishing filter is backwashable, the backwashing of the additional or polishing filter preferably takes place in conjunction with the backwashing of the primary filter medium used in the context of the present invention.

The filter medium will be typically used in a suitable element or housing and may additionally employ layers for support, drainage, and the like. For example, the filter medium will be typically equipped with end caps for directing the flow of the catalytic reaction product through the filter medium. In particular, the filter medium will typically utilize an open end cap and a blind end cap which will fit over the ends of the filter element so as to ensure that the catalytic reaction product does not bypass the filter medium. The filter element may also use two open end caps to enable the filter element to be used in series with other filter elements. The end caps may be of any suitable material and can be secured to the filter element in any suitable manner. Generally, the end caps will be prepared from the same material as the core or from thermoplastics.

The present invention may be used to treat the catalytic reaction product at any acceptable flow rate, consistent with the overall design of the system. Further, the method of the present invention may be used in batch process or continuous process catalytic reactions, and is capable of being automatically operated and controlled as an automated system with actuated valving instrumentation and a programmable logic controller.

The following examples further illustrate the present invention but, of course, should not be construed as in any way limiting its scope.

EXAMPLE 1

This example illustrates the expected use of the present inventive method to recover Raney nickel catalyst from a hydrogenation reaction product and compares the effectiveness of the present inventive method with a similar technique utilizing a different type of filter which has been used in catalytic processes.

A hydrogenation reaction is carried out in the presence of suspended Raney nickel catalyst having a mean particle diameter of about 2–3 microns. At the end of the reaction, the Raney nickel is allowed to settle to the bottom of the reaction vessel. The supernatant is drawn from the reaction vessel and contains the hydrogenation reaction product and about 5–10 g/l suspended Raney nickel catalyst. The hydrogenation reaction product is passed through a Profile® septa filter medium (Pall Corporation) having a 72%±1% void volume and a 99.98% removal efficiency at 5 microns. The concentration of Raney nickel in the hydrogenation reaction product is thereby reduced to about 3 ppm. The filter medium is backflushed to clear the filter medium of entrained Raney nickel catalyst, and the process repeated.

Fifty such cycles can be carried out without a significant increase in pressure drop across the filter medium between cycles. The removed Raney nickel catalyst in the backwash can be recovered and reclaimed.

Since an acceptable pressure drop across the filter medium is maintained from cycle to cycle, the filter medium need not be frequently replaced. By comparison, a porous stainless steel filter having a 5 micron pore rating, depending on method of manufacture and catalyst particle size distribution, may experience a steady increase in pressure drop across the filter from cycle to cycle and subsequently become permanently plugged in fewer than 50 cycles. Some such porous metal filters will become clogged even more rapidly, e.g., in less than 35 cycles.

EXAMPLE 2

This example illustrates the expected use of the present inventive method to recover Raney nickel catalyst from a hydrogenation reaction product in conjunction with a polishing filter to further reduce the Raney nickel contamination level in the hydrogenation reaction product.

A hydrogenation reaction is carried out in the presence of suspended Raney nickel catalyst having a mean particle diameter of less than about 5 microns. At the end of the reaction, the Raney nickel is allowed to settle to the bottom of the reaction vessel. The supernatant is drawn from the reaction vessel and contains the hydrogenation reaction product and up to about 20 g/l suspended Raney nickel catalyst. The hydrogenation reaction product is passed in succession through a primary filter medium and a polishing filter. The primary filter medium is a Profile® septa filter medium (Pall Corporation) having a 72%±1% void volume and a 99.98% removal efficiency at 10 microns, while the polishing filter is an HDC® filter (Pall Corporation) having a 1.2 micron pore rating.

By passing the hydrogenation reaction product through the primary filter medium and the polishing filter, the concentration of Raney nickel in the hydrogenation reaction product can be reduced to about 2 ppm or less. The primary filter medium, but not the polishing filter, is backflushed to clear the filter medium of entrained Raney nickel catalyst, and the process repeated. Upon clogging of the polishing filter, i.e., the HDC® filter of 1.2 micron pore rating, the polishing filter is either backwashed or replaced.

It is anticipated that hundreds of such cycles, probably over a thousand such cycles, can be carried out without exceeding an acceptable pressure drop across the primary filter medium, i.e., before the primary filter medium must be replaced. The removed Raney nickel catalyst in the backwash can be recovered and reclaimed.

While this invention has been described with an emphasis upon preferred embodiments, it will be obvious to those of ordinary skill in the art that variations in the preferred method may be used and that it is intended that the invention may be practiced otherwise than as specifically described herein. Accordingly, this invention includes all modifications encompassed within the spirit and scope of the invention as defined by the following claims.

What is claimed is:

1. A method of removing a catalyst from a liquid catalytic reaction product, wherein said catalyst has a mean particle diameter of about 20 microns or less, which method comprises (a) passing a liquid catalytic reaction product containing a solid catalyst through a hollow tubular filter medium which comprises a nonwoven web of fibers, has a tapered pore distribution such that the pore size of the filter medium decreases in the direction of normal fluid flow, and is backwashable, (b) backwashing said filter medium, and (c) repeating steps (a) and (b) at least about 50 times.

2. The method of claim 1, wherein said filter medium has a 99.98% removal efficiency at about 10 microns or less.

3. The method of claim 2, wherein said filter medium has a void volume of about 75% or less.

4. The method of claim 3, wherein said filter medium has a void volume of about 60% to about 72%.

5. The method of claim 1, wherein said catalyst has a mean particle diameter of about 5 microns or less.

6. The method of claim 5, wherein said catalyst has a mean particle diameter of about 3 microns or less.

7. The method of claim 6, wherein said catalyst is selected from the group consisting of nickel, palladium, and platinum.

8. The method of claim 7, wherein said catalyst is selected from the group consisting of Raney nickel, nickel sulfide, nickel tungsten sulfide, and nickel molybdenum.

9. The method of claim 8, wherein said catalyst is Raney nickel.

10. The method of claim 9, wherein said catalytic reaction product is passed through said filter medium so as to reduce the concentration of catalyst remaining in said catalytic reaction product to about 10 ppm or less.

11. The method of claim 10, wherein said catalytic reaction product is passed through said filter medium so as to reduce the concentration of catalyst remaining in said catalytic reaction product to about 3 ppm or less.

12. The method of claim 11, wherein said filter medium comprises fibers selected from the group consisting of polypropylene fibers and polyester fibers.

13. The method of claim 12, wherein said filter medium comprises polypropylene fibers.

14. The method of claim 13, wherein said catalytic reaction product is a liquid hydrogenation reaction product.

15. A method of removing a catalyst from a liquid catalytic reaction product, which method comprises (a) passing a liquid hydrogenation reaction product containing Raney nickel catalyst having a mean particle diameter of about 3 microns or less through a hollow cylindrical filter medium which comprises a nonwoven web of fibers, has a tapered pore distribution such that the pore size of the filter medium decreases in the direction of normal fluid flow, has a 99.98% removal efficiency at about 10 microns or less, and is backwashable, (b) backwashing said filter medium, and (c) repeating steps (a) and (b) at least about 50 times.

16. The method of claim 15, wherein said filter medium has a void volume of about 75% or less.

17. The method of claim 16, wherein said filter medium has a void volume of about 60% to about 72%.

18. The method of claim 17, wherein said hydrogenation reaction product is passed through said filter medium so as to reduce the concentration of Raney nickel catalyst remaining in said hydrogenation reaction product to about 3 ppm or less.

19. The method of claim 18, wherein said hydrogenation reaction product is passed through said filter medium so as to reduce the concentration of Raney nickel catalyst remaining in said hydrogenation reaction product to about 2 ppm or less.

20. The method of claim 1, wherein steps (a) and (b) are repeated at least about 50 times without a significant increase in pressure drop across said filter medium.

21. The method of claim 1, wherein steps (a) and (b) are repeated at least about 1000 times.

22. The method of claim 21, wherein steps (a) and (b) are repeated at least about 2000 times.

23. The method of claim 15, wherein steps (a) and (b) are repeated at least about 50 times without a significant increase in pressure drop across said filter medium.

24. The method of claim 15, wherein steps (a) and (b) are repeated at least about 1000 times.

25. The method of claim 24, wherein steps (a) and (b) are repeated at least about 2000 times.

* * * * *